(12) United States Patent
Amano

(10) Patent No.: US 12,307,051 B2
(45) Date of Patent: May 20, 2025

(54) INPUT DISPLAY DEVICE

(71) Applicant: Alps Alpine Co., Ltd., Tokyo (JP)

(72) Inventor: Takashi Amano, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/505,322

(22) Filed: Nov. 9, 2023

(65) Prior Publication Data

US 2024/0184404 A1   Jun. 6, 2024

(30) Foreign Application Priority Data

Dec. 6, 2022 (JP) .................................. 2022-194647

(51) Int. Cl.
*G06F 3/041* (2006.01)
*G06F 3/02* (2006.01)
*G06F 3/044* (2006.01)

(52) U.S. Cl.
CPC ............ *G06F 3/04186* (2019.05); *G06F 3/02* (2013.01); *G06F 3/044* (2013.01); *G06F 2203/04108* (2013.01)

(58) Field of Classification Search
None
See application file for complete search history.

(56) References Cited

U.S. PATENT DOCUMENTS

2015/0169114 A1   6/2015   King
2015/0277760 A1  10/2015   Tagaya
2023/0400924 A1*  12/2023   Gaillard .................. G06F 3/044

FOREIGN PATENT DOCUMENTS

JP       2020-190832 A    11/2020
WO   WO 2022/090091 A1    5/2022

OTHER PUBLICATIONS

Extended European Search Report from EP 23212696.1, May 3, 2024, 9 pgs.

* cited by examiner

*Primary Examiner* — Stephen T. Reed
(74) *Attorney, Agent, or Firm* — Crowell & Moring LLP

(57) ABSTRACT

An input display device includes a display configured to display an image, a capacitive touch panel attached on the display, a keyboard-shaped/protruding switch attached on the touch panel, a touch sensing unit configured to sense a position of an operation target when the operation target approaches the touch panel, and an operation determination unit configured to determine presence or absence of a touch operation on the keyboard-shaped/protruding switch based on a variation in positions of the operation target sensed by the touch sensing unit.

11 Claims, 5 Drawing Sheets

INPUT DISPLAY DEVICE

RELATED APPLICATION

The present application claims priority to Japanese Patent Application No. 2022-194647, filed Dec. 6, 2022, the entirety of which is herein incorporated by reference.

BACKGROUND

1. Field

The present disclosure relates to an input display device having a human-machine interface function, and more particularly, to an input display device including a three-dimensional operation unit.

2. Description of the Related Art

An input display device is disclosed in which a protrusion is provided on a touch panel disposed to be superimposed on a display, and an image such as an operation icon is displayed at a position overlapping the protrusion (for example, JP 2020-190832 A). The user performs an input by performing a touch operation on the protrusion.

SUMMARY

In a display device that performs a capacitive touch operation, there has been proposed a user interface (hereinafter, referred to as a three-dimensional UI) in which a cover glass has an uneven shape, so that a touch position is tactilely recognized and the touch position can be understood without looking.

FIG. 1A is an operation example of a conventional flat touch panel, where a user U visually recognizes an operation icon 12 displayed on a display 10, and performs an input by performing a touch operation on the position of the operation icon 12 (note in the example of Figure).

FIG. 1B is an operation example of a touch panel having a three-dimensional UI, and FIG. 1C is a schematic cross-sectional view of the three-dimensional UI. A transparent cover lens 26 having an uneven shape is attached on a touch panel 24 including a capacitive sensor, and a display 20 displays an operation icon 22 at a position overlapping the cover lens 26. The user U performs input by touching the cover lens 26 with a finger. A highly sensitive electrostatic sensor capable of detecting the electrostatic capacitance (distance) of the finger even when the finger is away from the sensor is used for the touch detection, and the presence or absence of the touch can be determined even with the thick cover lens 26. This makes it possible to reduce touch mistakes (operation error) under a situation where it is difficult to look at the in-vehicle display during driving.

In the three-dimensional UI, in order to realize a shape imitating various physical switches (buttons, knobs, sliders, and the like) existing in the vehicle interior and operation sensing thereof by a touch panel, it is required to cope with various operation gestures.

As one of the in-vehicle switches, as illustrated in FIGS. 2A and 2B, there is a keyboard-shaped or protruding switch 30 protruding in the horizontal direction from the display. The keyboard-shaped/protruding switch 30 has an operation face 32 extending laterally from a touch panel 40. A method of operating such a keyboard-shaped/protruding switch 30 is different from a method of operating a normal flat-shaped switch. In the flat-shaped switch, as illustrated in FIG. 2C, a finger U is touched or pushed in the screen direction with respect to the flat operation face 42 on the touch panel 40, but in the keyboard-shaped/protruding switch, as illustrated in FIG. 2D, a touch operation is performed by placing the finger U on an operation face 44 protruding laterally from the touch panel 40.

A more specific operation method will be described with reference to FIGS. 3A and 3B. FIG. 3A is a schematic cross section of a flat-shaped switch, and a flat cover glass 42 is attached on the touch panel 40. The user moves the finger U in the X direction and brings the finger U close to the cover glass 42 to perform a touch operation. For this reason, the distance from the sensor of the touch panel 40 to the finger U greatly changes, and the difference in value of the electrostatic capacitance measured at the time of touch/non-touch increases, and thus, it is easy to determine the threshold value of the presence or absence of the touch operation.

On the other hand, in the keyboard-shaped/protruding switch, as illustrated in FIG. 3B, the cover glass 42 is attached onto the touch panel 40, and the cover glass 42 has a protrusion 44 protruding in a direction away from the touch panel 40.

When the user performs a touch operation on the protrusion 44, the user moves the finger U in the Y direction from a position P1 away from the touch panel 40 by a distance D, and places the finger U on the front face of the protrusion 44 at a position P2. While the finger U is at the distance D from the touch panel 40 at the position P1, since the finger U floats in the air without contacting the cover glass 42, the electrostatic capacitance measured by the sensor is small, and the touch operation of the finger U is not sensed. While the finger U is at the distance D from the touch panel 40 at the position P2, since the finger U comes into contact with the front face of the protrusion 44, the electrostatic capacitance measured by the center increases, and the touch operation of the finger U is sensed.

However, when the finger U is placed on the front face of the protrusion 44, since the finger U is away from the touch panel 40 by the distance D, the difference between the electrostatic capacitance at the time of non-contact at the position P1 and the electrostatic capacitance at the time of contact at the position P2 does not greatly change, and it is difficult to determine the presence or absence of the touch operation. For this reason, in the touch operation on the keyboard-shaped/protruding switch, a sensing method capable of accurately determining the presence or absence of the touch operation is required.

The present disclosure solves such a conventional problem. It is an object of the present disclosure to provide an input display device capable of accurately sensing the presence or absence of a touch operation on a keyboard-shaped/protruding switch.

An input display device according to the present disclosure includes a display configured to display an image, a capacitive touch panel mounted on the display, a keyboard-shaped/protruding switch provided on the touch panel, a sensing unit configured to sense a position of an operation target when the operation target approaches the touch panel, and a determination unit configured to determine presence or absence of a touch operation on the keyboard-shaped/protruding switch based on a variation in positions of the operation target sensed by the sensing unit.

In one aspect, the determination unit determines whether a variation in sensed positions of the operation target is large, determines that a touch operation on the keyboard-shaped/protruding switch is not performed when the variation is large, and determines that a touch operation on the keyboard-shaped/protruding switch is performed when the variation is small. In an aspect, the determination unit compares a variation in sensed positions of the operation target with a threshold value, determines that a touch operation on the keyboard-shaped/protruding switch is not performed when the variation is equal to or greater than the threshold value, and determines that a touch operation on the keyboard-shaped/protruding switch is performed when the variation is less than the threshold value. In an aspect, the determination unit acquires a certain number of sensed positions of the operation target, and calculates a variation in positions of the operation target from the certain number of the acquired positions of the operation target. In an aspect, the input display device further includes a cover glass on the touch panel, wherein the cover glass includes at least one keyboard-shaped/protruding switch, and wherein the keyboard-shaped/protruding switch includes a front face extending laterally from a front face of the touch panel. In an aspect, the display is an in-vehicle display.

According to the present disclosure, since the presence or absence of the touch operation on the keyboard-shaped/protruding switch is determined based on the variation in sensed positions of the operation target, the determination accuracy of the touch operation on the keyboard-shaped/protruding switch can be improved, and erroneous determinations can be minimized.

DETAILED DESCRIPTION

An input display device of the present disclosure provides an interface between a person and a machine. The input display device of the present disclosure is not particularly limited, but is applied to, for example, an electronic device equipped with a display having touch panel. The electronic device equipped with the display with a touch panel is, for example, an in-vehicle device having a navigation function, an audio visual function, a television function, and/or the like.

Figure 4:
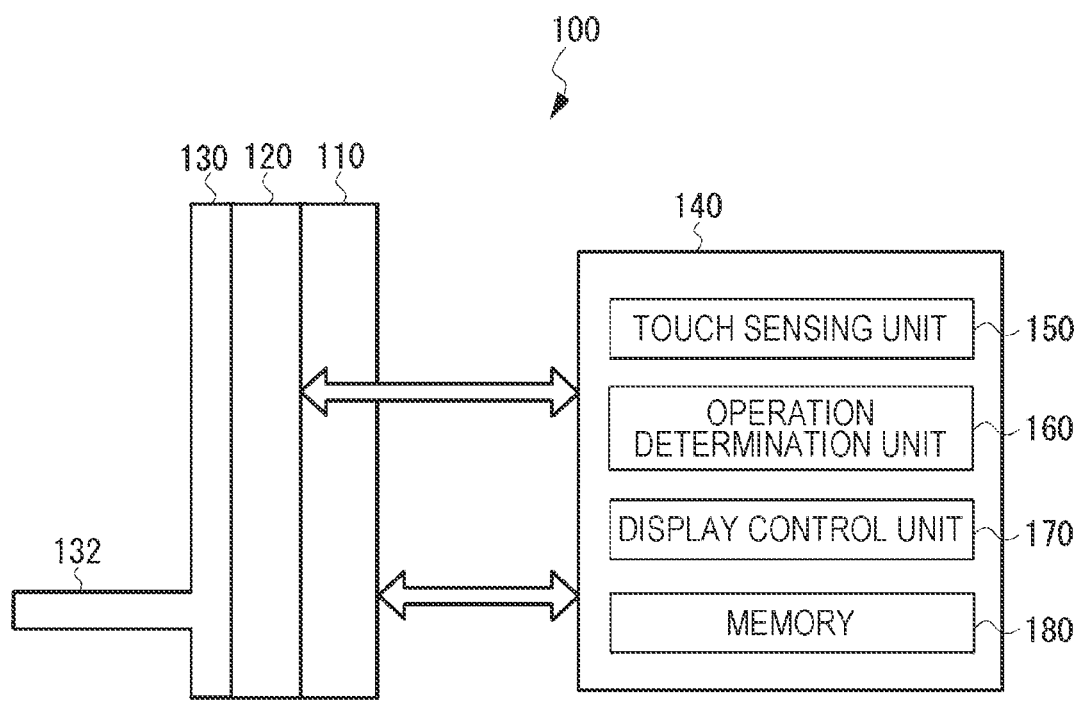
FIG. 4 is a block diagram illustrating a configuration of an input display device according to an embodiment of the present disclosure.

Next, embodiments of the present disclosure will be described in detail with reference to the drawings. FIG. 4 is a block diagram illustrating a configuration of an input display device according to an embodiment of the present disclosure. An input display device 100 of the present embodiment includes a display 110 configured to display an image and a video, a touch panel 120 including a capacitive sensor mounted on the display 110, a cover glass 130 attached to a front face of the touch panel 120 and including a keyboard-shaped/protruding switch 132 as a three-dimensional UI, and a controller 140 configured to control image display on the display 110, touch sensing on the touch panel 120, and the like.

The display 110 is not particularly limited, but includes, for example, a liquid crystal panel or an organic EL panel, and displays image data provided from the controller 140. For example, an operation icon representing an input operation may be displayed at a corresponding position of the keyboard-shaped/protruding switch 132.

The touch panel 120 includes, for example, a plurality of sensors (sensing units) formed at positions where a plurality of X-side and Y-side electrode lines intersect, and the sensor senses an electrostatic capacitance when a user's finger, hand, or the like approaches or comes into contact with the cover glass 130 or the keyboard-shaped/protruding switch 132. The touch panel 120 is mounted on the display 110 and provides an input interface for the user to make an input to an icon or the like displayed on the display 110.

The cover glass 130 is attached to the front face of the touch panel 120. The cover glass 130 may be part of the touch panel 120, or may be prepared separately from the touch panel 120.

One or more keyboard-shaped/protruding switches 132 are formed on the cover glass 130 as a three-dimensional UI. The keyboard-shaped/protruding switch 132 has a keyboard-shaped or protruding shape, and the protruding shape includes at least a front face extending laterally from the cover glass 130, that is, a front face extending in a direction away from the touch panel 120. This front face has a size that allows at least a user's finger to be placed thereon.

Figure 1A:
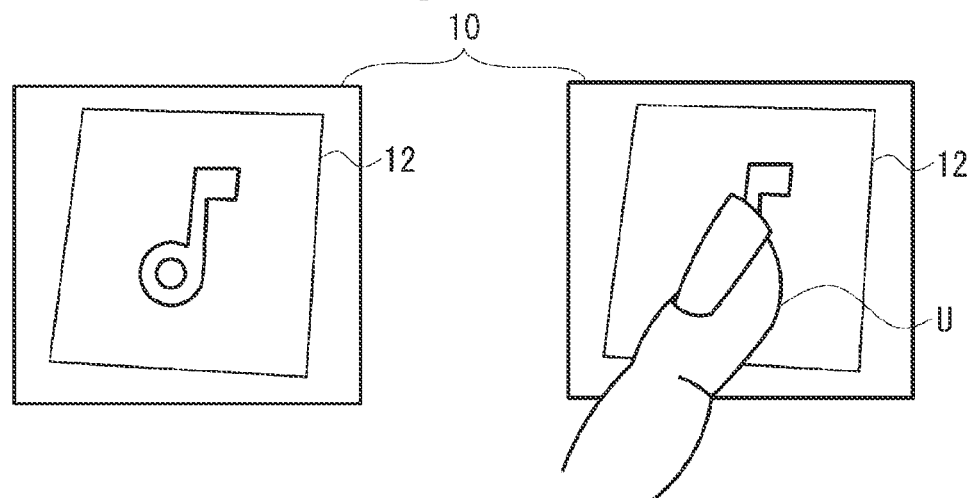
FIG. 1A illustrates an operation example of a flat touch panel.
Figure 1B:
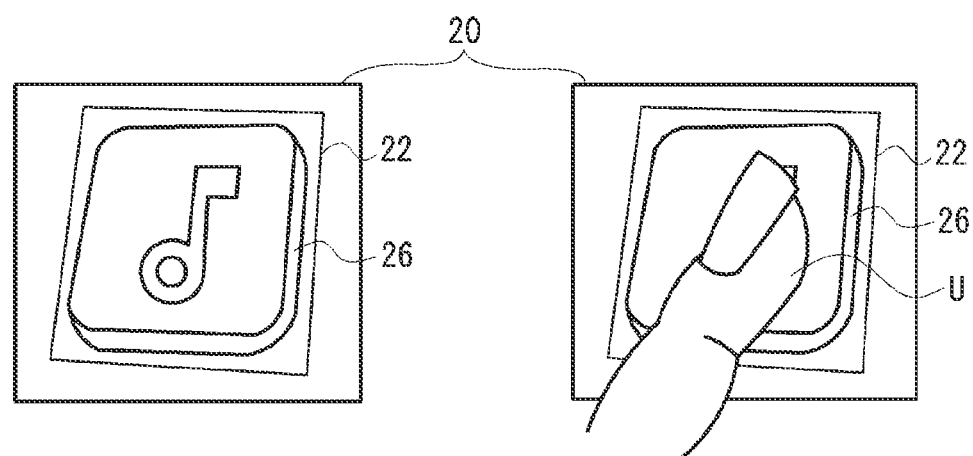
FIG. 1B illustrates an operation example of a touch panel of a three-dimensional UI.
Figure 1C:
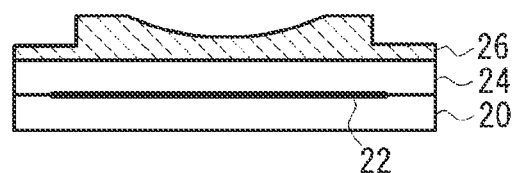
FIG. 1C is a schematic cross-sectional view of the three-dimensional UI.
Figure 2A:
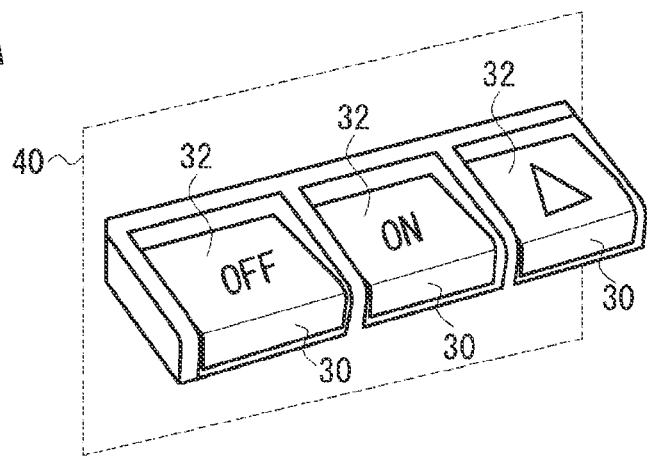
FIGS. 2A and 2B are perspective views illustrating a configuration example of a keyboard-shaped/protruding switch.
Figure 2B:
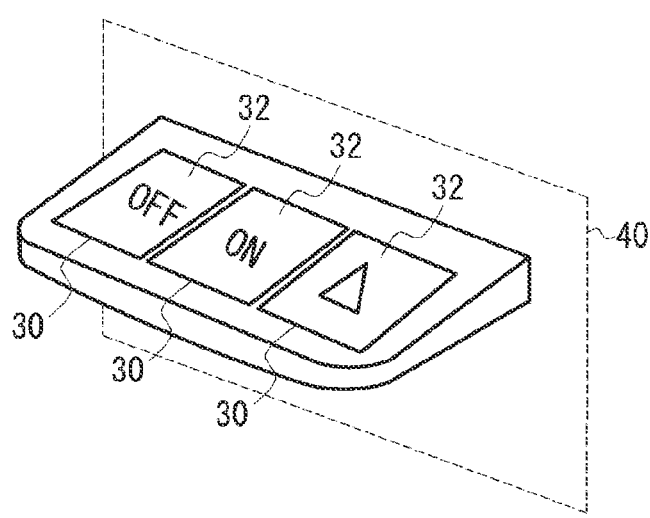
Figure 2C:
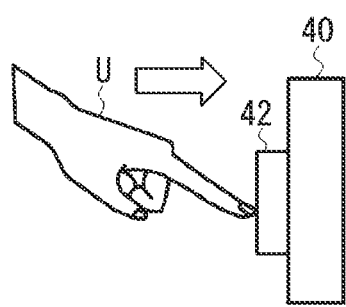
FIG. 2C is an operation example of a flat-shaped switch.
Figure 2D:
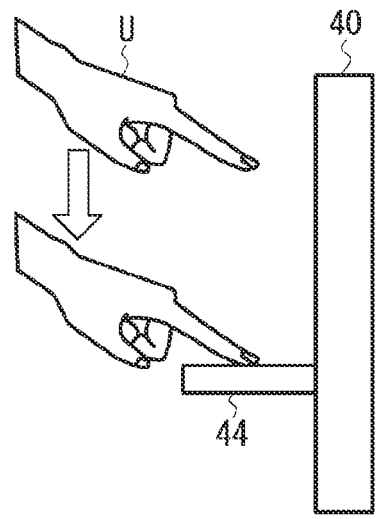
FIG. 2D is a view illustrating an operation example of a keyboard-shaped/protruding switch.

The shape, size, thickness, material, and the like of the keyboard-shaped/protruding switch 132 are not particularly limited, but include, for example, the operation face 32 extending laterally from the front face of the touch panel 40, as illustrated in FIGS. 2A and 2B. The operation face 32 is not necessarily transparent, and characters, symbols, figures, and the like representing the content of the input operation may be drawn on the operation face. Further, the operation face 32 is not necessarily flat, and may include some irregularities, be linearly inclined, or be curved, for example.

Further, the keyboard-shaped/protruding switch 132 may be formed integrally with the cover glass 130 or may be separate from the cover glass 130. For example, the side face of the rectangular keyboard-shaped/protruding switch 132 may be attached to the cover glass 130 with a double-sided adhesive or the like. In this case, the keyboard-shaped/protruding switch 132 can be made of a material different from the cover glass 130, and be made of, for example, acrylic, polycarbonate, or the like.

The coordinate position of the keyboard-shaped/protruding switch 132 on the touch panel 120 is registered in the memory of the controller 140, and when a finger approaching the touch panel 120 is sensed, the controller 140 determines whether the finger is a touch operation of the keyboard-shaped/protruding switch 132. Furthermore, the controller 140 can display an icon representing an input operation in the vicinity of the keyboard-shaped/protruding switch 132 via the display 110. The user visually recognizes an icon drawn on the operation face of the keyboard-shaped/protruding switch 132 or an icon displayed on the display 110, and performs an input operation by touching the keyboard-shaped/protruding switch 132.

The controller 140 includes hardware and/or software resources, and performs overall processing of the input display device using, for example, an arithmetic processing unit, a microcontroller including a ROM/RAM, or the like. For example, the controller performs display processing of the display 110, touch sensing or operation determination (sense touch position and finger distance, and determine whether the touch operation is performed) from an output value of the touch panel 120, and processing of video display/video switching according to the touch sensing or operation determination.

In an aspect, as illustrated in FIG. 4, controller 140 includes a touch sensing unit 150, an operation determination unit 160, a display control unit 170, and a memory 180. These units 150, 160, 170, 180 may be implemented by the controller 140, including the hardware and/or software resources referenced above. The touch sensing unit 150 drives the plurality of electrode lines on the X side and/or the Y side of the touch panel 120, measures the electrostatic capacitance of each sensing unit (sensor) of the driven electrode lines, senses the touch position based on the measurement result, and provides the sensing result to the operation determination unit 160.

The operation determination unit 160 determines the presence or absence of a touch operation on the touch panel 120 or a touch operation on the keyboard-shaped/protruding switch 132 based on the measurement result of the touch sensing unit 150. The touch mentioned here includes not only contact of the user's finger with the cover glass 130 and the keyboard-shaped/protruding switch 132 but also approach of the finger to the cover glass 130 and the keyboard-shaped/protruding switch 132. For example, when the user's finger contacts or approaches the flat front face of the cover glass 130, the operation determination unit 160 determines the presence or absence of a touch operation based on a change in electrostatic capacitance of a corresponding sensing unit (sensor), and similarly, when the user's finger contacts or approaches the keyboard-shaped/protruding switch 132, the operation determination unit determines the presence or absence of a touch operation on the keyboard-shaped/protruding switch 132 based on a change in electrostatic capacitance of a corresponding sensing unit (sensor).

The display control unit 170 displays an image and a video on the display 110, and displays an icon at a corresponding position of the keyboard-shaped/protruding switch 132, as necessary. When no icon is drawn on the operation face of the keyboard-shaped/protruding switch 132, an icon representing the operation content of the keyboard-shaped/protruding switch 132 can be displayed on the display 110. In addition, the display control unit 170 switches an image to be displayed on the display 110 to another image in response to the operation determination unit 160 determining that a touch operation has been performed.

The memory 180 stores information about coordinates, a size, and the like of the keyboard-shaped/protruding switch 132, and coordinates of a touch position (finger position) sensed by the touch sensing unit 150, and the like. In addition, the memory 180 may store image data such as an icon to be displayed in the vicinity of the keyboard-shaped/protruding switch 132.

Next, a sensing operation of a touch operation of the keyboard-shaped/protruding switch according to the present embodiment will be described. In the present embodiment, an algorithm is used to determine whether a finger is in a state of not touching the keyboard-shaped/protruding switch in the air, or in a state of touching the keyboard-shaped/protruding switch, based on an amount of shake or variation in sensed finger positions.

Figure 3A:
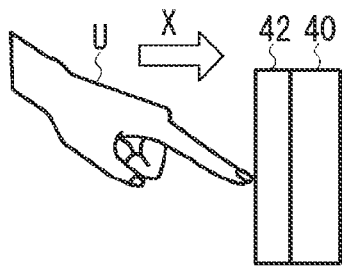
FIG. 3A is a diagram illustrating a specific operation example of a flat-shaped switch.
Figure 3B:
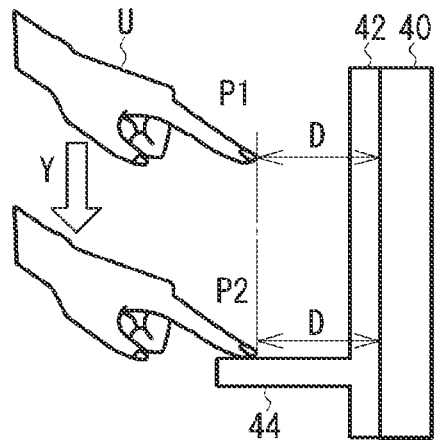
FIG. 3B is a diagram illustrating a specific operation example of a keyboard-shaped/protruding switch.
Figure 5:
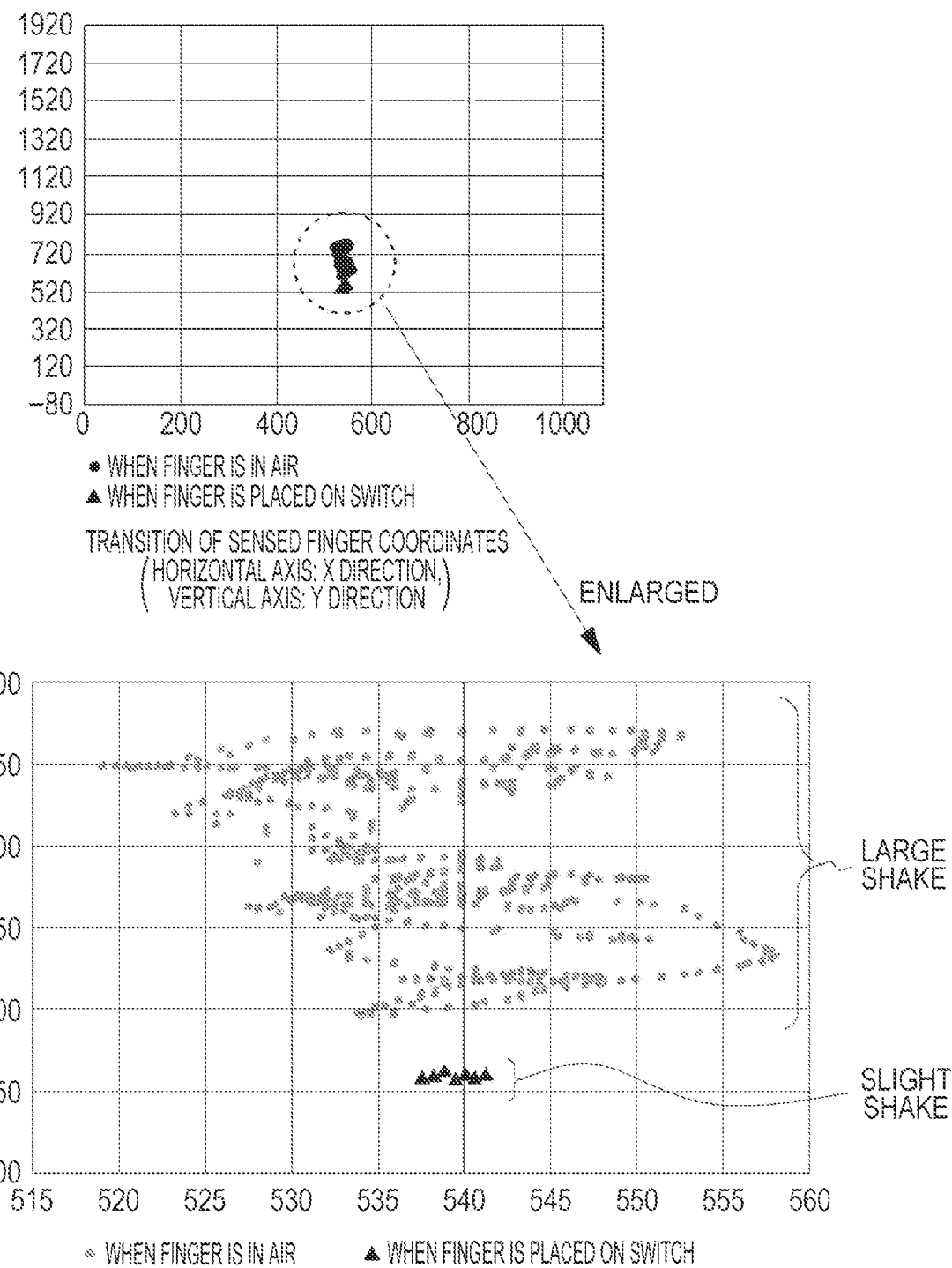
FIG. 5 is a graph illustrating transition of a finger position (x, y coordinates) sensed when the finger is in the air and when the finger is placed on the keyboard-shaped/protruding switch.

FIG. 5 is a graph of a finger position (x, y coordinates) sensed when the finger is brought close to the keyboard-shaped/protruding switch, and the lower graph is an enlarged view of the sensed finger position. A circular dot (●) represents a finger position when the finger is in the air, that is, a finger position when the finger U is not in contact with the keyboard-shaped/protruding switch 44, at the position P1 in FIG. 3B. A triangle (▲) represents a finger position when the finger U is placed on the front face of the keyboard-shaped/protruding switch 132, that is, a finger position when the finger U is in contact with the operation face of the keyboard-shaped/protruding switch 44, at the position P2 in FIG. 3B.

As is clear from the graph, it can be seen that the amount of shake (variation) of the finger position sensed when the finger U touches the front face of the keyboard-shaped/protruding switch is small, but the amount of shake (variation) of the finger position sensed when the finger is in the air is large. That is, depending on whether the finger touches the keyboard-shaped/protruding switch, a magnitude difference occurs in an amount of shake (variation) of the sensed finger position. The sensing algorithm of the present embodiment determines that there is a touch operation on the keyboard-shaped/protruding switch in a case where the amount of shake is small, and determines that there is no touch operation on the keyboard-shaped/protruding switch in a case where the amount of shake is large, based on the amount of shake (variation) of the sensed finger position.

A specific example of the sensing algorithm is shown below.
 1. The transition of a certain number of the finger positions sensed by the touch sensing unit 150 is recorded. For example, coordinates of a certain number of sensed finger positions are stored in the memory 180.
 2. For the transition of the recorded finger position (coordinate position), for example, the variation in transition amounts of the finger position is calculated from variance, standard deviation, and/or the like.
 3. When the variation is equal to or less than the threshold value, it is determined that the finger is placed on the keyboard-shaped/protruding switch. That is, it is determined that a touch operation on the keyboard-shaped/protruding switch has been performed.

Here, the threshold value for determining the magnitude of the variation is determined based on the sensing accuracy of the sensor of the touch panel 120. For example, in a case where the variation is calculated by the variance, the threshold value is set by a method in which whether the variance is a certain value or more or a movement average of x and y coordinate positions is obtained, and when the value exceeds 1σ of the normal distribution, the shake is large (a finger is in the air), and when the value is within 1σ, the shake is small (a keyboard-shaped switch is touched). Note that the determination of the amount of shake (variation) is not limited to the above algorithm, and any method may be used as long as the difference in the amount of shake can be determined, as illustrated in the graph.

Figure 6:
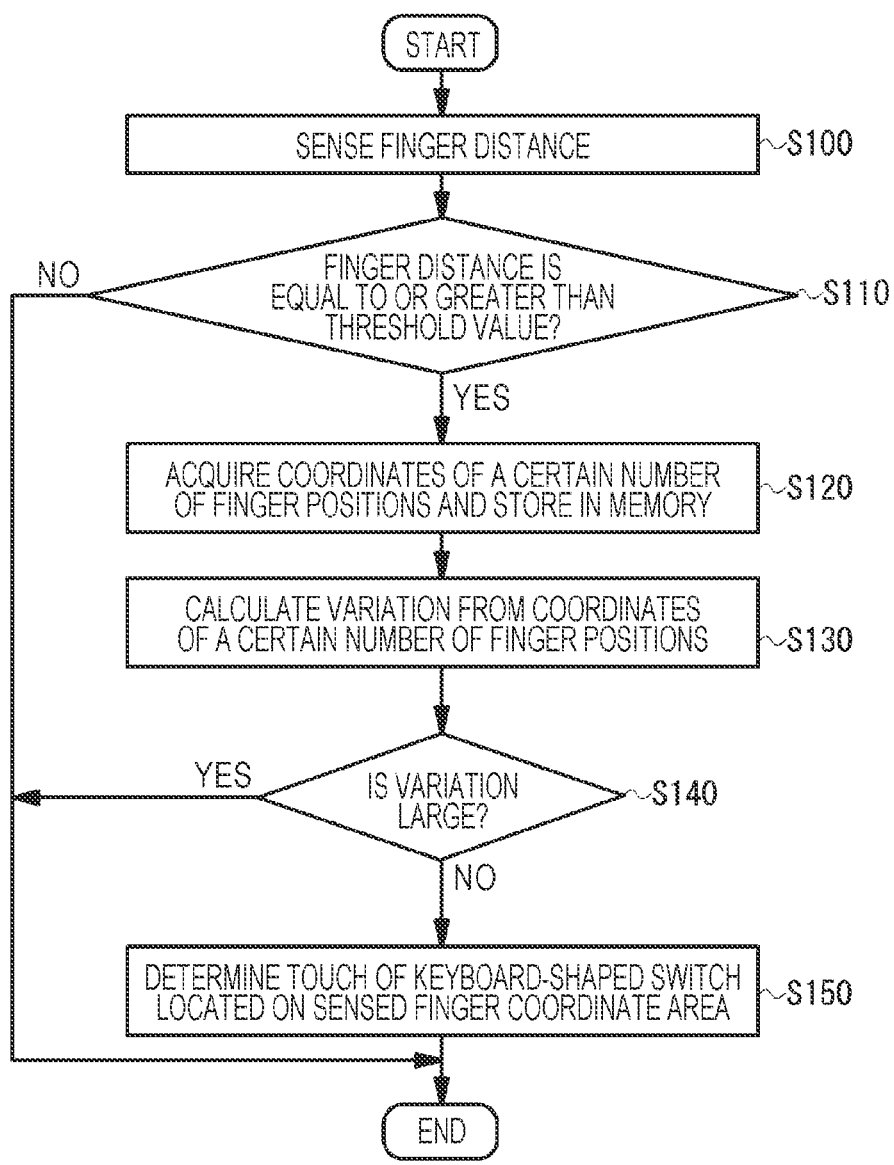
FIG. 6 is an operation flow illustrating a sensing algorithm of a touch operation of a keyboard-shaped/protruding switch according to an embodiment of the present disclosure.

FIG. 6 illustrates an operation flow of the sensing algorithm of the present embodiment. The touch sensing unit 150 senses the finger distance based on the measured electrostatic capacitance (S100). The finger distance is a distance from the sensor of the touch panel 120 to the finger. The finger distance sensed by the touch sensing unit 150 is provided to the operation determination unit 160.

The operation determination unit 160 determines whether the sensed finger distance is equal to or greater than a threshold value (S110), that is, determines that the finger approaches the touch panel 120 when the finger distance is equal to or less than the threshold value. When determining that the finger is approaching, the operation determination unit 160 starts to acquire the coordinates of the finger position (X, Y coordinates), and stores the coordinates of a certain number of finger positions in the memory 180 (S120). Although the number of finger positions to be acquired is any number, for example, coordinates of 10 consecutive finger positions are acquired. When the sensor senses an electrostatic capacitance at 60 fps (frames per second), coordinates of 10 consecutive finger positions are obtained during 0.1 seconds.

Next, the operation determination unit 160 calculates a variation in finger positions from the coordinates of a certain number of finger positions stored in the memory (S130). A method of calculating the variation is any method, and for example, dispersion, standard deviation, and/or the like can be used. The variation is calculated in each of the X coordinate and the Y coordinate of the finger position.

Next, the operation determination unit 160 determines whether the variation is large (S140). For example, when the variance is used for calculating the variation, it is determined whether the variation exceeds a threshold value, and when the standard deviation is used, it is determined whether the variation falls within 1σ. This determination is made on each of the X coordinate and the Y coordinate of the finger position, and it is determined that the variation in finger positions is large when the variation in both the X coordinate and the Y coordinate is equal to or larger than the threshold value.

When it is determined that the variation is large, it is determined that the finger does not touch the keyboard-shaped/protruding switch (the finger is in the air), and this routine is ended, and preparation for next finger sensing is performed. On the other hand, when it is determined that the variation is small, it is determined that the finger touches the keyboard-shaped/protruding switch located in the sensed finger coordinate area (S150). As a result, the controller 140 determines that an input operation on the keyboard-shaped/protruding switch has been performed.

As described above, according to the present embodiment, in the keyboard-shaped/protruding switch, the presence or absence of the touch operation on the keyboard-shaped/protruding switch is determined by utilizing the event that the magnitude difference occurs in the amount of shake (variation) of the finger position sensed depending on whether the finger touches the keyboard-shaped/protruding switch. Therefore, the determination accuracy of the touch operation on the keyboard-shaped/protruding switch is improved, and erroneous determinations can be minimized.

In the above embodiment, the example in which the user touches the touch panel (cover glass) with a finger is used, but the present disclosure is not necessarily limited to the finger, and the present disclosure is also applied to a case where the user touches the touch panel (cover glass) with a hand or other members. In the above embodiment, the variance or the standard deviation is used for calculating the variation, but this is an example, and the variation may be calculated by another method.

The preferred embodiments of the present disclosure have been described in detail above. However, the present disclosure is not limited to the specific embodiments, and thus various modifications and alterations can be made in the scope of the gist of the invention in the claims.

What is claimed is:

1. An input display device comprising:
   a display that displays an image;
   a capacitive touch panel mounted on the display;
   a keyboard-shaped/protruding switch provided on the touch panel;
   a sensing unit that senses an x and y coordinate position of an operation target when the operation target approaches the touch panel; and,
   a determination unit that determines a presence or an absence of a touch operation on the keyboard-shaped/protruding switch based on a variation in x and y coordinate positions of the operation target sensed by the sensing unit;
   wherein the determination unit determines whether a variation in sensed x and y coordinate positions of the operation target is large, and determines that a touch operation on the keyboard-shaped/protruding switch is not performed when the variation is large, and that a touch operation on the keyboard-shaped/protruding switch is performed when the variation is small.

2. The input display device according to claim 1, wherein the determination unit acquires a certain number of sensed positions of the operation target, and calculates a variation in positions of the operation target from the certain number of the acquired position of the operation target.

3. The input display device according to claim 1, further comprising:
   a cover glass on the touch panel, wherein the cover glass includes at least one keyboard-shaped/protruding switch, and wherein the keyboard-shaped/protruding switch includes an operation face extending laterally from a front face of the touch panel.

4. The input display device according to claim 1, wherein the display is an in-vehicle display.

5. The input display device according to claim 1, wherein the determination unit determines that a touch operation on the keyboard-shaped/protruding switch is large when the variation is greater than one standard deviation.

6. The input display device according to claim 1, wherein the determination unit determines that a touch operation on the keyboard-shaped/protruding switch is small when the variation is less than one standard deviation.

7. An input display device comprising:
   a display that displays an image;
   a capacitive touch panel mounted on the display;
   a keyboard-shaped/protruding switch provided on the touch panel;
   a sensing unit that senses an x and y coordinate position of an operation target when the operation target approaches the touch panel; and,
   a determination unit that determines a presence or an absence of a touch operation on the keyboard-shaped/protruding switch based on a variation in x and y coordinate positions of the operation target sensed by the sensing unit;
   wherein the determination unit compares a variation in sensed x and y coordinate positions of the operation target with a threshold value, and determines that a touch operation on the keyboard-shaped/protruding switch is not performed when the variation is equal to or greater than the threshold value, and that a touch operation on the keyboard-shaped/protruding switch is performed when the variation is less than the threshold value.

8. The input display device according to claim 7, wherein the determination unit acquires a certain number of sensed positions of the operation target, and calculates a variation in positions of the operation target from the certain number of the acquired positions of the operation target.

9. The input display device according to claim 7, further comprising:
   a cover glass on the touch panel, wherein the cover glass includes at least one keyboard-shaped/protruding switch, and wherein the keyboard-shaped/protruding switch includes an operation face extending laterally from a front face of the touch panel.

10. The input display device according to claim 7, wherein the display is an in-vehicle display.

11. The input display device according to claim 7, wherein the threshold value is one standard deviation.

* * * * *